United States Patent
Shinozaki

(10) Patent No.: US 9,637,036 B2
(45) Date of Patent: May 2, 2017

(54) VEHICLE SEAT AND COUPLING METHOD FOR USE IN VEHICLE SEAT

(71) Applicants: TOYOTA BOSHOKU KABUSHIKI KAISHA, Aichi-ken (JP); TOYOTA JIDOSHA KABUSHIKI KAISHA, Aichi-ken (JP); SHIROKI CORPORATION, Kanagawa (JP)

(72) Inventor: Yushi Shinozaki, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 57 days.

(21) Appl. No.: 14/694,449

(22) Filed: Apr. 23, 2015

(65) Prior Publication Data

US 2015/0307009 A1    Oct. 29, 2015

(30) Foreign Application Priority Data

Apr. 25, 2014    (JP) .................................. 2014-091079

(51) Int. Cl.
*B60N 2/68* (2006.01)
*B32B 37/18* (2006.01)

(52) U.S. Cl.
CPC .............. *B60N 2/682* (2013.01); *B32B 37/18* (2013.01); *B32B 2605/00* (2013.01)

(58) Field of Classification Search
CPC .. B60N 2/682; B60N 2/0155; B60N 2/01583; B60N 2/06
See application file for complete search history.

(56) References Cited

U.S. PATENT DOCUMENTS

| | | | | |
|---|---|---|---|---|
| 5,038,437 A | * | 8/1991 | Russell | B60N 2/01575 16/260 |
| 5,527,080 A | * | 6/1996 | Wahlqvist | B60N 2/01583 248/503.1 |

(Continued)

FOREIGN PATENT DOCUMENTS

JP    2012-030634    2/2012

OTHER PUBLICATIONS

U.S. Appl. No. 14/692,107 to Yushi Shinozaki, filed Apr. 21, 2015.

*Primary Examiner* — Timothy J Brindley
(74) *Attorney, Agent, or Firm* — Greenblum & Bernstein, P.L.C.

(57) ABSTRACT

A vehicle seat includes a coupling bracket coupling the side frame to the floor-side seat supporting member and fixed to the side frame by welding joining. An upper part of the coupling bracket and a lower part of the side frame are overlapped with each other in an overlapped region. An edge of a first member as one of the coupling bracket and the side frame in the overlapped region is welded, in a first welding joining portion, to a second member as the other of the coupling bracket and the side frame. A joining hole extending through the first member in a plate thickness direction thereof is provided at a position in the overlapped region other than the first welding joining portion, and an edge of the joining hole is welded, in a second welding joining portion, to the second member.

9 Claims, 4 Drawing Sheets

(56) References Cited

U.S. PATENT DOCUMENTS

| | | | | |
|---|---|---|---|---|
| 2004/0075292 A1* | 4/2004 | Rausch | B60N 2/01541 | 296/65.03 |
| 2005/0057082 A1* | 3/2005 | Hatta | B60N 2/01583 | 297/341 |
| 2006/0138839 A1* | 6/2006 | Ryan | B60N 2/01583 | 297/340 |
| 2008/0224520 A1* | 9/2008 | Veluswamy | B60N 2/01583 | 297/335 |
| 2010/0109415 A1* | 5/2010 | Roszczenko | B60N 2/22 | 297/452.18 |
| 2010/0219674 A1* | 9/2010 | Sakkinen | B60N 2/0722 | 297/452.18 |
| 2010/0270845 A1* | 10/2010 | Wilson | B60N 2/68 | 297/452.18 |
| 2011/0006574 A1* | 1/2011 | Carroll | B60N 2/01583 | 297/316 |
| 2012/0007406 A1* | 1/2012 | Yamamoto | B60N 2/065 | 297/452.18 |
| 2012/0043796 A1* | 2/2012 | Kurachi | B60N 2/01583 | 297/337 |
| 2013/0038098 A1* | 2/2013 | Maier | B60N 2/682 | 297/216.1 |
| 2013/0069415 A1* | 3/2013 | Yasuda | B60N 2/682 | 297/452.18 |
| 2013/0088066 A1* | 4/2013 | Sasaki | B60N 2/16 | 297/452.38 |
| 2013/0106153 A1* | 5/2013 | Kaku | B60N 2/4235 | 297/216.1 |
| 2013/0169021 A1* | 7/2013 | Jinno | B60N 2/0155 | 297/463.1 |
| 2013/0249265 A1* | 9/2013 | Kaneda | B60N 2/3013 | 297/340 |
| 2014/0056639 A1* | 2/2014 | Wroblewski | B60N 2/0155 | 403/327 |
| 2014/0224553 A1* | 8/2014 | Ozawa | B60N 2/002 | 177/136 |
| 2014/0232163 A1* | 8/2014 | Eckhoff | B60N 2/68 | 297/452.19 |
| 2015/0014999 A1* | 1/2015 | Fujii | B60N 2/366 | 292/92 |
| 2015/0091338 A1* | 4/2015 | Hayashi | B60N 2/4435 | 297/180.1 |
| 2015/0091358 A1* | 4/2015 | Hattori | B60N 2/06 | 297/452.2 |
| 2015/0129737 A1* | 5/2015 | Oya | B60N 2/0722 | 248/429 |
| 2015/0136938 A1* | 5/2015 | Kondo | B60N 2/502 | 248/573 |
| 2015/0307007 A1* | 10/2015 | Shinozaki | B60N 2/06 | 297/344.1 |
| 2015/0307009 A1* | 10/2015 | Shinozaki | B32B 37/18 | 297/452.18 |
| 2015/0307011 A1* | 10/2015 | Ushiyama | B60N 2/5825 | 297/344.1 |
| 2015/0336477 A1* | 11/2015 | Matsui | B60N 2/682 | 297/344.15 |
| 2015/0375637 A1* | 12/2015 | Kikuchi | B60N 2/12 | 297/317 |
| 2016/0059739 A1* | 3/2016 | Tsuji | B60N 2/0705 | 248/429 |

* cited by examiner

VEHICLE SEAT AND COUPLING METHOD FOR USE IN VEHICLE SEAT

INCORPORATION BY REFERENCE

The disclosure of Japanese Patent Application No. 2014-091079 filed on Apr. 25, 2014 including the specification, drawings and abstract is incorporated herein by reference in its entirety.

BACKGROUND OF THE INVENTION

1. Field of the Invention

The invention relates to a vehicle seat and a coupling method for use in the vehicle seat. More particularly, the invention relates to a vehicle seat in which a side frame of a seat cushion and a floor-side seat supporting member are coupled to each other by a coupling bracket, and a coupling method for use in the vehicle seat.

2. Description of Related Art

A vehicle seat provided in a vehicle such as an automobile (hereinafter simply referred to as "a seat" sometimes) is usually constituted of a seat cushion which is a seat section of a seated occupant, and a seat back which supports the back of the seated occupant. Furthermore, a seat slide rail mechanism is disposed as a floor-side seat supporting member between a floor and the seat so that a position of the seat with respect to the vehicle floor can be adjusted. In the seat slide rail mechanism, an upper rail disposed on a seat cushion side is slidably fitted in a lower rail disposed on a floor side. Such a vehicle seat is described in, for example, Japanese Patent Application Publication No. 2012-30634 (JP 2012-30634 A).

The seat cushion in the seat having the seat slide rail mechanism as described above and the seat slide rail mechanism are coupled to each other by a coupling bracket which couples a side frame forming a framework of the seat cushion to the upper rail of the seat slide rail mechanism. At this time, the side frame and the coupling bracket are usually coupled to each other by arc welding. As shown in FIG. 6, a side frame 118 and a coupling bracket 130 in the form of plates are overlapped with each other, and edge portions X1 and X2 of the side frame 118 and the coupling bracket 130 which are overlapped with each other are arc-welded to join both the side frame and the coupling bracket to each other. That is, the side frame 118 and the coupling bracket 130 are welded in two portions for coupling the side frame 118 and the coupling bracket 130.

When the side frame 118 and the coupling bracket 130 are coupled to each other, the coupling bracket 130 may be disposed at an outer position or an inner position of the side frame 118, in a width direction of the seat. In this case, when welding operation is performed on two portions according to the abovementioned usual method, one of welded portions is formed in an outer part of the side frame 118.

As shown in FIG. 6, when the two edge portions of the side frame 118 and the coupling bracket 130 which are overlapped with each other are welded, welding operation directions, from which the welding operations for the two edge portions are performed, are opposite to each other. That is, the portion X1 at the edge of the side frame 118 is welded from the right side in FIG. 6, and the portion X2 at the edge of the coupling bracket 130 is welded from the left side in FIG. 6.

Therefore, when the welding operation to couple the side frame 118 to the coupling bracket 130 is performed, an operation for reversing a combination body of the side frame 118 and the coupling bracket 130 is required. Therefore, in a flow operation of a mass production line, a jig may be complicated, and that time may increase.

SUMMARY OF THE INVENTION

According to the present invention, there are provided a vehicle seat in which a welding operation can be performed from one direction when an upper side frame and a coupling bracket are coupled to each other in a plurality of welding portions, and a coupling method for use in the vehicle seat.

A first aspect of the invention relates to a vehicle seat including: a seat cushion having a side frame; a floor-side seat supporting member; and a coupling bracket that couples the side frame to the floor-side seat supporting member, the coupling bracket being fixed to the side frame by welding joining. An upper part of the coupling bracket and a lower part of the side frame are overlapped with each other in an overlapped region. An edge of a first member as one of the coupling bracket and the side frame in the overlapped region is welded, in a first welding joining portion, to a second member as the other of the coupling bracket and the side frame. A joining hole that extends through the first member in a plate thickness direction of the first member is provided at a position in the overlapped region other than the first welding joining portion, and an edge of the joining hole is welded, in a second welding joining portion, to the second member.

A second aspect of the invention relates to a coupling method for use in a vehicle seat including a seat cushion having a side frame, a floor-side seat supporting member, and a coupling bracket that couples the side frame to the floor-side seat supporting member, the coupling bracket being fixed to the side frame by welding joining. The coupling method includes: overlapping an upper part of the coupling bracket with a lower part of the side frame in an overlapped region; welding, in a first welding joining portion, an edge of a first member as one of the coupling bracket and the side frame to a second member as the other of the coupling bracket and the side frame, from a first member side; providing a joining hole that extends through the first member in a plate thickness direction of the first member at a position in the overlapped region other than the first welding joining portion; and welding, in a second welding joining portion, an edge of the joining hole to the second member, from the first member side.

According to the abovementioned constitutions, it is possible to perform the welding operation from the same side (the first member side) for both the first welding joining portion and the second welding joining portion. When the first member is the side frame, a lower edge of the side frame is welded to the upper part of the coupling bracket as the second member in the first welding joining portion. Furthermore, the joining hole is provided in the lower part of the side frame, and the edge of the joining hole is welded to the upper part of the coupling bracket in the second welding joining portion. In this case, the welding operation can be performed from a side frame side for both the first welding joining portion and the second welding joining portion. On the other hand, when the first member is the coupling bracket, an upper edge of the coupling bracket is welded to the lower part of the side frame as the second member in the first welding joining portion. Furthermore, the joining hole is made in the upper part of the coupling bracket, and the edge of the joining hole is welded to the lower part of the side frame in the second welding joining portion. In this case, the welding operation can be performed from the coupling bracket side for both the first welding joining portion and the second welding joining portion. In consequence, even when the first member is the side frame or the coupling bracket, welding operation directions for the two different welding joining portions are the same direction.

Therefore, the welding in the two welding joining portions can easily be performed.

The first member may be the side frame. In general, the side frame has a high strength, and hence providing the joining hole hardly affects the strength of the side frame. In addition, the joining hole may be a long hole elongated in a forward-backward direction of the seat cushion. When the joining hole is the long hole, the firm welding joining can be performed.

The coupling bracket may be disposed on an outer side of the side frame in a width direction of the seat cushion. In this case, the side frame is disposed on an inner side of the coupling bracket. When the first member is the side frame disposed on the inner side of the coupling bracket, a welded portion can be formed on an inner part of the side frame. This inner part of the side frame is not covered with a cushion pad, and hence the cushion pad is not damaged by the welded region. That is, the welded portion is not formed on the outer part of the side frame covered with the cushion pad, and hence the cushion pad is not damaged.

The coupling bracket may be formed by using a plate member, and reinforcing projections each having a hat-shaped cross section may be provided in both end portions of the coupling bracket in a forward-backward direction of the seat cushion. In consequence, the strength of the whole coupling bracket can improve.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
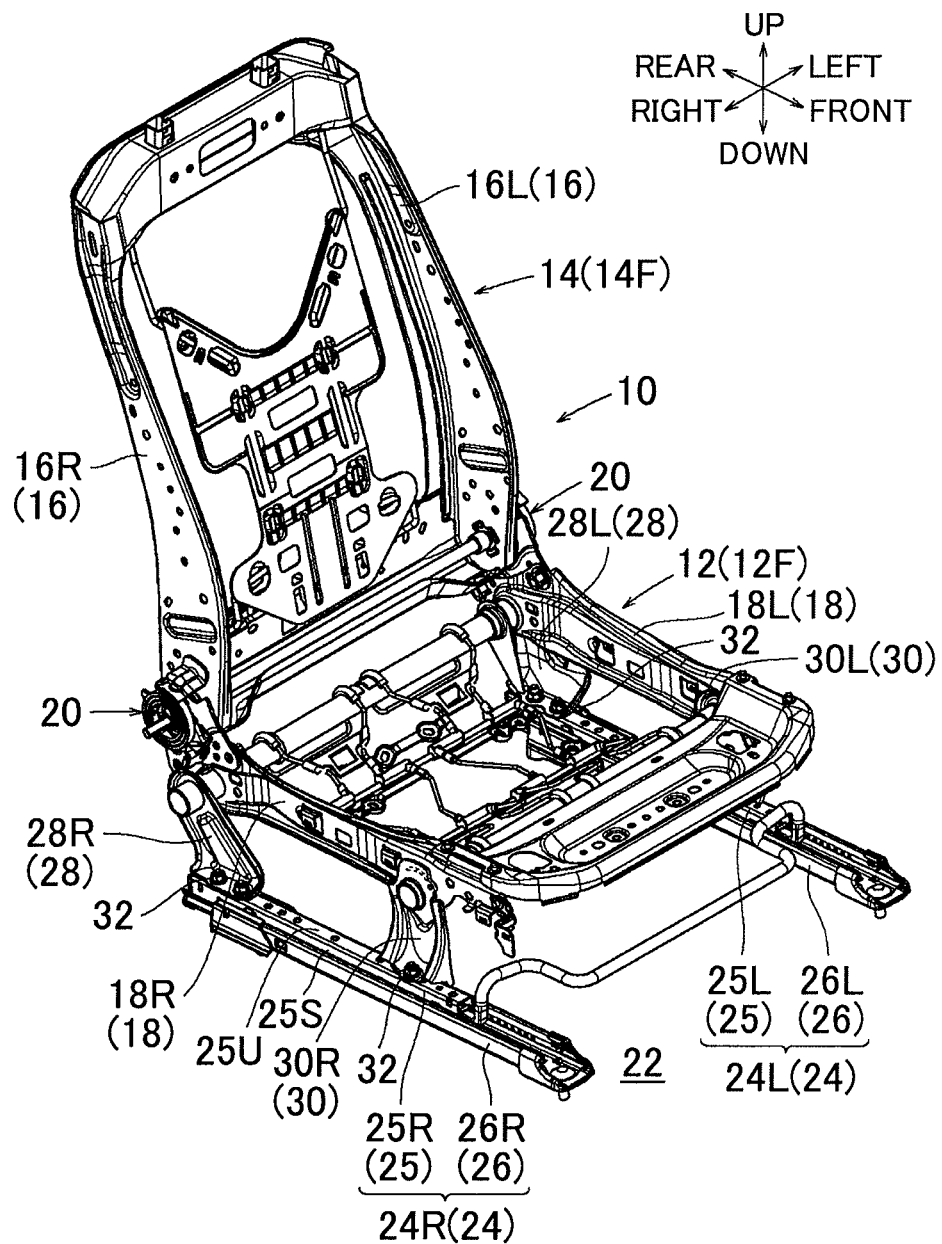
FIG. 1 is a perspective view showing a framework of a vehicle sheet of an embodiment of the present invention.

Hereinafter, an embodiment of the present invention will be described with reference to the drawings. In this embodiment, a vehicle seat provided in an automobile is described as an example of a vehicle seat. It is to be noted that directions described in the following description indicate directions seen from a seated occupant sitting on the vehicle seat. Furthermore, arrows in the respective drawings show the directions. In addition, R or L attached to reference numerals is used to distinguish a component on the right side from a component on the left side, and R indicates the component on the right side and L indicates the component on the left side.

FIG. 1 shows a framework of a vehicle seat 10. The vehicle seat 10 is constituted of a seat cushion 12 which is a seat section of the seated occupant, and a seat back 14 which supports the back of the seated occupant. Frameworks of the seat cushion 12 and the seat back 14 are formed by using a cushion frame 12F and a back frame 14F, respectively. The back frame 14F has side frames 16R and 16L on both the right and left sides, and is entirely formed in a frame shape. The cushion frame 12F also has side frames 18R and 18L on both the right and left sides, and is entirely formed in a frame shape. The seat back 14 and the seat cushion 12 are coupled to each other via a reclining mechanism 20 which couples the back frame 14F to the cushion frame 12F so as to be rotatable around an axis, and the seat back 14 can be tilted in a forward-backward direction by the reclining mechanism 20.

On the surface of a floor 22 below the side frames 18R and 18L on both the right and left sides of the seat cushion 12, seat slide rail mechanisms 24 are disposed. In the present embodiment, each of the seat slide rail mechanisms 24 is not disposed immediately below a side frame 18 but is disposed at a slightly offset position. A right seat slide rail mechanism 24R is disposed at a position slightly offset from the right side frame 18R in a right direction (an outer direction of the seat) in a width direction (a right-left direction) of the seat cushion 12. A left seat slide rail mechanism 24L is disposed at a position slightly offset from the left side frame 18L in the right direction (an inner direction of the seat) in the width direction.

The seat slide rail mechanism 24 is constituted of an upper rail 25 and a lower rail 26. The lower rail 26 is fixed to the floor 22. The upper rail 25 has an upper surface 25U and right and left side surfaces 25S. In consequence, a transverse section of the upper rail 25 has a hat shape. In addition, the upper rail 25 slidably fits in the lower rail 26. It is to be noted that the transverse section of the upper rail 25 refers to a cross section in a direction perpendicular to a longitudinal direction of the upper rail 25.

The side frame 18 of the seat cushion 12 and the seat slide rail mechanism 24 are coupled to each other via front and rear coupling brackets 30 and 28. With this configuration, the whole seat 10 is slidable in the forward-backward direction by the seat slide rail mechanism 24, and a position of the seat 10 in the forward-backward direction with respect to the floor 22 can be adjusted. It is to be noted that in the present embodiment, the seat slide rail mechanism 24 (the upper rail 25) functions as a seat supporting member.

Front and rear coupling brackets 30R and 28R provided for the right side frame 18R are both disposed at an outer position of the side frame 18R in the width direction (the right-left direction) of the seat. A front coupling bracket 30L provided for the left side frame 18L is disposed at an inner position of the side frame 18L in the width direction (the right-left direction) of the seat. On the other hand, a rear coupling bracket 28L provided for the left side frame 18L is disposed at an outer position of the side frame 18L in the width direction (the right-left direction) of the seat. The coupling brackets 28L, 28R, 30L and 30R are placed in surface contact with the upper surfaces 25U of the upper rails 25, and fixed to the upper surface 25U by fasteners 32 constituted by, for example, a bolt and a nut, to be coupled to the seat slide rail mechanisms 24L and 24R.

Figure 2:
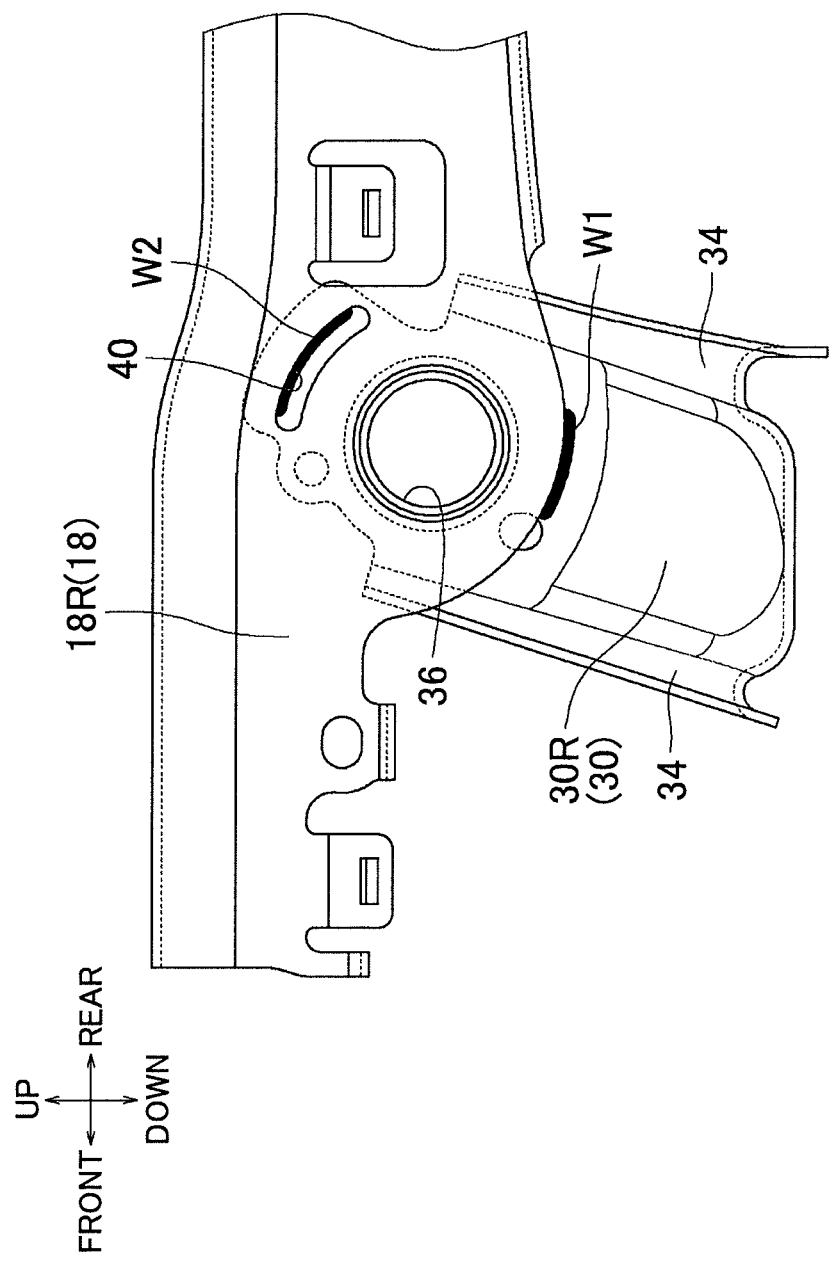
FIG. 2 is an enlarged view of a coupling portion between a side frame of a seat cushion and a coupling bracket in FIG. 1.

The present invention is applied to welding joining between the side frame 18R and the front right and front left coupling brackets 30R and 30L in the present embodiment. FIG. 2 is an enlarged side view of the front coupling bracket 30R provided for the right side frame 18R when viewed from an inner side of the seat. In the width direction (the right-left direction) of the seat cushion 12, the coupling bracket 30R is disposed at the outer position of the side frame 18R.

Figure 3:
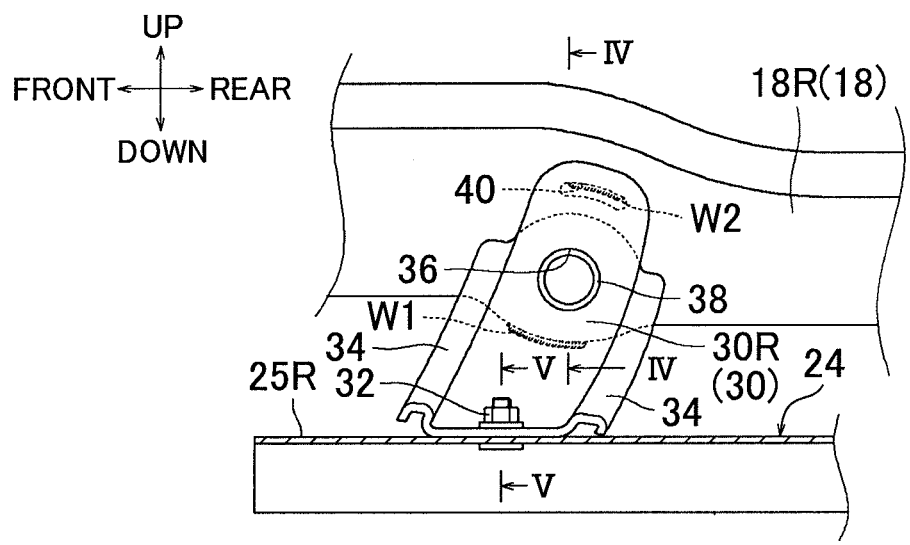
FIG. 3 is a view schematically showing a coupled state of the coupling bracket to the side frame and a seat slide rail mechanism.
Figure 4:
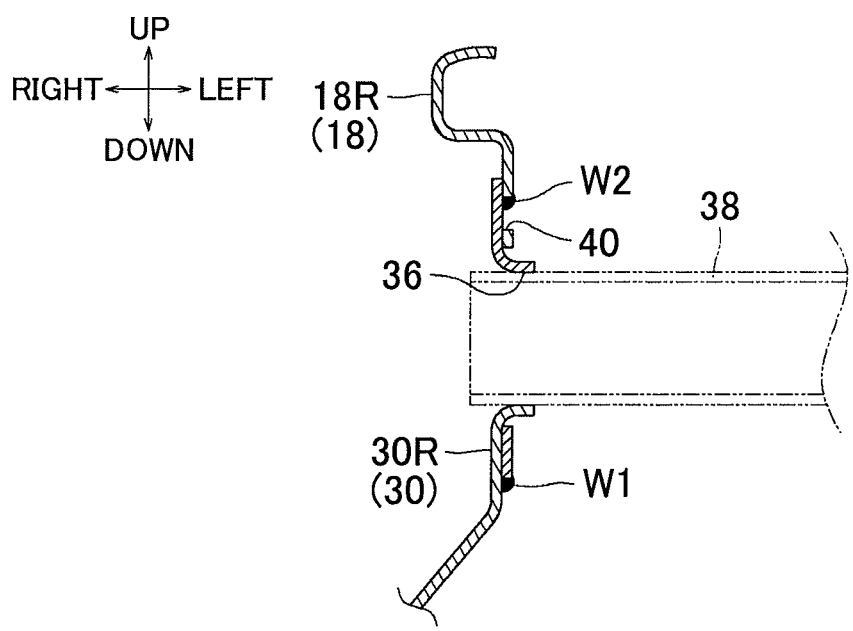
FIG. 4 is a sectional view taken along the IV-IV line of FIG. 3.

FIG. 3 is a side view when viewed from an outside of the seat, and FIG. 4 is a sectional view taken along the IV-IV line of FIG. 3. The coupling bracket 30R is formed by using a plate member, and is formed in a shape elongated in an upward-downward direction in FIG. 3. Furthermore, the coupling bracket 30R is disposed across a space between the side frame 18R and the upper rail 25R of the seat slide rail mechanism 24. On both sides of a main body portion of the coupling bracket 30R formed in the shape elongated in the upward-downward direction (in both end portions the coupling bracket 30R in the forward-backward direction of the seat cushion 12), reinforcing projections 34 are provided. The reinforcing projections 34 improve strength of the whole coupling bracket 30R.

Figure 5:
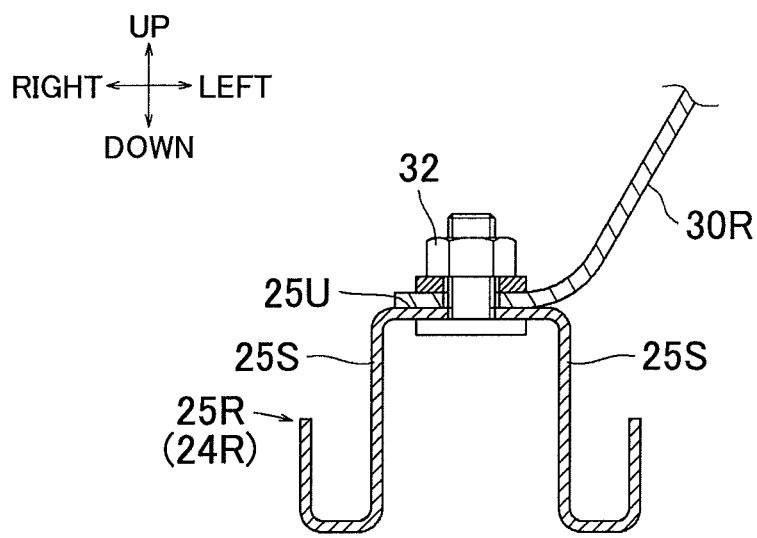
FIG. 5 is a sectional view taken along the V-V line of FIG. 3.

As schematically shown in FIG. 3 and FIG. 5, a lower end portion of the coupling bracket 30R is fixed to the upper surface 25U of the upper rail 25R of the seat slide rail mechanism 24R by the fastener 32 as also described above. As shown in FIG. 5, the upper rail 25R has the upper surface 25U and both the side surfaces 25S, and has a hat-shaped cross section. The lower end portion of the coupling bracket 30R is placed in surface contact with the upper surface 25U of the upper rail 25R, and fixed thereto by the fastener 32.

An upper end portion of the coupling bracket 30R is coupled to the side frame 18R by the welding joining in two portions. As shown in FIG. 4, a lower part of the side frame 18R in the form of a plate extends downwardly. An upper part of the coupling bracket 30R in the form of a plate is in surface contact with and over lapped with the lower part of the side frame 18R in the form of the plate. An overlapped region where both the plate parts of the side frame 18R and the coupling bracket 30R are overlapped with each other is set to be a welding joining candidate region for both the components 18R and 30R. Furthermore, two portions in this welding joining candidate region are set to be welding joining portions W1 and W2 on which welding operation is performed. It is to be noted that a fitting hole 36 is formed at a substantially central position in the overlapped region (the welding joining candidate region). A shaft 38 extended across a space between the right and left side frames 18R and 18L is fitted into the fitting hole 36, and the shaft 38 constitutes the cushion frame 12F.

The first welding joining portion W1 in a welding joining candidate range is a position of a lower edge of the side frame 18R as shown in FIG. 3 and FIG. 4. In the welding joining portion W1, the lower edge of the side frame 18R is arc-welded to the plate part of the coupling bracket 30R. A welding length of the arc welding is set to a necessary and sufficient length from the viewpoint of a joining strength.

The second welding joining portion W2 is set to a position away from the first welding joining portion W1 in the welding joining candidate region. In the present embodiment, the second welding joining portion W2 is positioned at an upper side of the coupling bracket 30R in the drawing. The first welding joining portion W1 and the second welding joining portion W2 are positioned symmetrically with respect to the central fitting hole 36. At a position of the side frame 18R which corresponds to the second welding joining portion W2, a joining hole 40 extending through the side frame 18R in a plate thickness direction is formed. The joining hole 40 is a long hole elongated in the right-left direction in FIG. 3 (the forward-backward direction of the seat 10). A length of the joining hole 40 is set to a necessary and sufficient length from the viewpoint of the joining strength of the welding. The welding in the joining hole 40 is performed by arc-welding an upper edge of the joining hole 40 to the plate part of the coupling bracket 30R.

Both welded portions of the first welding joining portion W1 and the second welding joining portion W2 mentioned above are positioned on the inner part of the side frame 18R, and both the welding operations performed from the seat inner side. The welding operations for the two different welding joining portions W1 and W2 are performed from the same side in this manner, which facilitates welding operation. As compared with this operation, when the welding joining portions are positioned on opposite sides, i.e., on the outer part and the inner part of the side frame 18R, the seat in assembling has to be inverted in the welding operation, which deteriorates operation efficiency.

Figure 6:
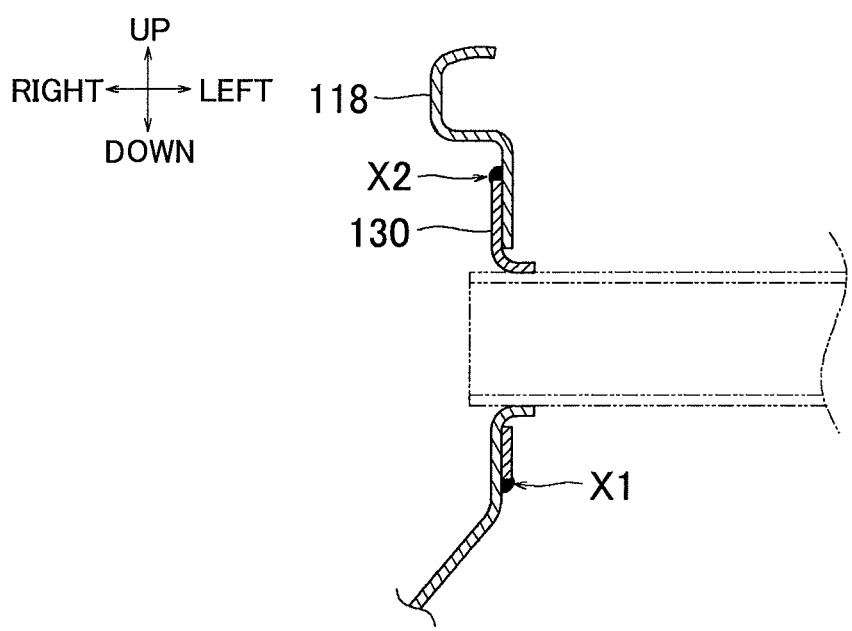
FIG. 6 is a sectional view of a conventional example shown in comparison with FIG. 4.

In addition, when the welded portion is formed on the outer part of the side frame 18 as shown in FIG. 6, this welded portion is covered with a cushion pad. Therefore, there is a possibility that the cushion pad is cut or damaged due to the welded portion.

The side frame 118 is covered with the cushion pad, and the cushion pad is further covered with a seat cover to form the seat cushion. Specifically, an upper portion of the side frame 118 above the outer part thereof is covered with the cushion pad. Therefore, the welded portion formed on the outer part of the side frame 118 mentioned above is also covered with the cushion pad.

On the other hand, the welded portions of the first welding joining portion W1 and the second welding joining portion W2 in the present embodiment mentioned above are formed on a side frame 18R which is overlapped with the coupling bracket 30R on the inner side. That is, the welded portions of the welding joining portions W1 and W2 are both formed on the inner part of the side frame 18R. This inner part of the side frame 18R is not covered with the cushion pad, and hence the cushion pad is not damaged by the welded portion. That is, the welded portion is not formed on the outer part of the side frame 18R to be covered with the cushion pad, and hence the cushion pad is not damaged by the welded portion.

It is to be noted that a detailed drawing of a coupling constitution between the left side frame 18L of the seat cushion 12 and the front coupling bracket 30L provided for the left side frame 18L is omitted. In this case, the coupling bracket 30L is disposed at the inner position of the side frame 18L. Furthermore, also in this coupling constitution, a joining hole is formed in the side frame 18L, and the arc welding is performed on two portions from the same direction in the same manner as in the abovementioned coupling constitution between the right side frame 18R and the coupling bracket 30R. Therefore, the welding operation can easily be performed in the same manner as in the above-mentioned coupling constitution. However, in this case, the side frame 18L overlapped with the coupling bracket 30L is an outer member of the seat, and hence two welded portions are both formed on the outer member of the seat.

The embodiment of the present invention has been described above, but the present invention can be carried out in various configurations other than the above embodiment.

For example, in the above embodiment, there has been described a case where a floor-side supporting member is the seat slide rail mechanism 24, but when the seat slide rail mechanism 24 is not disposed, the coupling brackets 28 and 30 may directly be attached to the floor 22.

Additionally, in the above embodiment, the joining hole 40 is formed in the side frame 18 of the seat cushion 12, but the joining hole 40 may be formed in the coupling bracket 30 as long as the strength of the coupling bracket 30 can be secured.

Additionally, in the above embodiment, the welding is the arc welding, but another welding may be employed.

The term vehicle may refer to any machine or conveyance that carries people or things from one place to another such as an automobile, a truck, a bus, a train, an aircraft, a boat, a vessel, and a submarine. However, it is noted that these examples are merely provided for purposes of enhancing understanding the present disclosure, and thus should not be construed as limiting.

What is claimed is:

1. A vehicle seat comprising:
   a seat cushion having a side frame;
   a floor-side seat supporting member; and
   a coupling bracket that couples the side frame to the floor-side seat supporting member, the coupling bracket being fixed to the side frame by welding joining, wherein
   an upper part of the coupling bracket and a lower part of the side frame overlap each other in an overlapped region;
   an edge of the lower part of the side frame is welded to the coupling bracket in the overlapped region at a first welding joining portion, and
   a joining hole that extends through the side frame in a plate thickness direction of the side frame is provided at a position in the overlapped region other than the first welding joining portion, and an edge of the joining hole is weld to the upper part of the coupling bracket at a second welding joining portion.

2. The vehicle seat according to claim 1, wherein the joining hole is a long hole elongated in a forward-backward direction of the seat cushion.

3. The vehicle seat according to claim 1, wherein the coupling bracket is disposed on an outer side of the side frame in a width direction of the seat cushion.

4. The vehicle seat according to claim 2, wherein the coupling bracket is disposed on an outer side of the side frame in a width direction of the seat cushion.

5. The vehicle seat according to claim 1, wherein
   the coupling bracket is formed by from a plate member; and
   reinforcing projections are provided in both end portions of the coupling bracket in a forward-backward direction of the seat cushion.

6. A coupling method for a vehicle seat including a seat cushion having a side frame, a floor-side seat supporting member, and a coupling bracket that couples the side frame to the floor-side seat supporting member, the coupling bracket being fixed to the side frame by welding joining, the coupling method comprising:
   overlapping an upper part of the coupling bracket with a lower part of the side frame in an overlapped region;
   welding, in a first welding joining portion, an edge of the side frame to the coupling bracket, from a side frame side of the overlapped region;
   providing a joining hole that extends through the side frame in a plate thickness direction of the side frame at a position in the overlapped region other than the first welding joining portion; and
   welding, in a second welding joining portion, an edge of the joining hole to the coupling bracket, from the side frame side of the overlapped region.

7. The vehicle seat according to claim 1, wherein
   an upper edge of the joining hole is welded to the coupling bracket.

8. The vehicle seat according to claim 1, wherein
   the joining hole is positioned on an opposite side of a fitting hole of the coupling bracket from the first welding joining portion.

9. The vehicle seat according to claim 1, wherein
   the joining hole is positioned between a fitting hole of the coupling bracket and an upper portion of the side frame.

* * * * *